(12) United States Patent
Miles

(10) Patent No.: US 11,397,028 B2
(45) Date of Patent: Jul. 26, 2022

(54) MONOLITHIC MACRO-FLUIDIC HEAT TRANSFER COMPONENTS AND METHODS FOR MANUFACTURING SAME

(71) Applicant: Mark W Miles, Oakland, CA (US)

(72) Inventor: Mark W Miles, Oakland, CA (US)

( * ) Notice: Subject to any disclaimer, the term of this patent is extended or adjusted under 35 U.S.C. 154(b) by 239 days.

(21) Appl. No.: 15/955,663

(22) Filed: Apr. 17, 2018

(65) Prior Publication Data

US 2018/0299167 A1 Oct. 18, 2018

Related U.S. Application Data

(60) Provisional application No. 62/486,929, filed on Apr. 18, 2017.

(51) Int. Cl.
| | | |
|---|---|---|
| *F24S 20/25* | (2018.01) | |
| *F24S 80/30* | (2018.01) | |
| *F24S 10/50* | (2018.01) | |
| *F24S 80/60* | (2018.01) | |
| *F24S 80/45* | (2018.01) | |
| *B29C 44/14* | (2006.01) | |
| *B29C 44/56* | (2006.01) | |
| *F24S 80/457* | (2018.01) | |
| *F24S 10/80* | (2018.01) | |
| *F24S 80/00* | (2018.01) | |
| *B29K 67/00* | (2006.01) | |
| *B29K 75/00* | (2006.01) | |
| *B29L 31/18* | (2006.01) | |
| *B29C 44/00* | (2006.01) | |

(52) U.S. Cl.
CPC ............. *F24S 20/25* (2018.05); *B29C 44/14* (2013.01); *B29C 44/5681* (2013.01); *F24S 10/50* (2018.05); *F24S 10/80* (2018.05); *F24S 80/30* (2018.05); *F24S 80/45* (2018.05); *F24S 80/457* (2018.05); *F24S 80/60* (2018.05); *B29C 44/00* (2013.01); *B29K 2067/00* (2013.01); *B29K 2075/00* (2013.01); *B29L 2031/18* (2013.01); *F24S 2080/013* (2018.05); *F24S 2080/03* (2018.05); *F24S 2080/05* (2018.05); *Y02E 10/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,943,911 A * | 3/1976 | Yu | ........................... | F24S 10/60 126/643 |
| 4,098,265 A * | 7/1978 | Gravely | ................... | F24S 10/50 126/705 |
| 4,128,096 A * | 12/1978 | Katz | ........................ | F24S 80/60 126/601 |
| 4,468,423 A * | 8/1984 | Hall | ........................ | B32B 15/20 428/72 |

(Continued)

*Primary Examiner* — David J Laux
(74) *Attorney, Agent, or Firm* — HM Law Group LLP; Vani Moodley, Esq.

(57) ABSTRACT

A solar collector is provided. The collector comprises a monolithic flow control component to direct a flow of the heat transfer fluid between an inlet and outlet; and a solar absorber supported by the monolithic flow control component. The monolithic flow control component is able to support the solar absorber without any additional structural components to lend mechanical strength to the monolithic flow control component.

16 Claims, 5 Drawing Sheets

(56) References Cited

U.S. PATENT DOCUMENTS

| | | | | |
|---|---|---|---|---|
| 4,474,173 A | * | 10/1984 | Ford | F24S 23/80 |
| | | | | 126/676 |
| 6,196,216 B1 | * | 3/2001 | Kooij | B29C 65/02 |
| | | | | 126/651 |
| 6,904,966 B2 | * | 6/2005 | Philpott | F28F 3/04 |
| | | | | 165/185 |
| 8,430,093 B1 | * | 4/2013 | Harris | F24S 23/79 |
| | | | | 126/685 |
| 8,562,334 B2 | | 10/2013 | Fields et al. | |
| 9,057,538 B2 | * | 6/2015 | Miles | F24S 10/95 |
| 10,088,200 B2 | * | 10/2018 | Russell | F24S 10/72 |
| 10,386,094 B2 | * | 8/2019 | Jilken | F24S 10/73 |
| 2009/0293866 A1 | * | 12/2009 | Horne | F24S 10/70 |
| | | | | 126/655 |
| 2011/0192393 A1 | * | 8/2011 | Swift | F24S 10/00 |
| | | | | 126/663 |
| 2012/0262040 A1 | * | 10/2012 | Karpovich | H02S 40/44 |
| | | | | 312/293.3 |
| 2013/0133858 A1 | * | 5/2013 | Friman | F28F 21/066 |
| | | | | 165/53 |
| 2014/0001766 A1 | * | 1/2014 | Sayer | F24S 80/60 |
| | | | | 290/1 R |
| 2014/0116420 A1 | * | 5/2014 | Lefay | F24S 10/753 |
| | | | | 126/634 |
| 2014/0165996 A1 | * | 6/2014 | Sastre | F24S 80/453 |
| | | | | 126/674 |
| 2014/0209090 A1 | * | 7/2014 | Snyder | F24S 50/40 |
| | | | | 126/643 |
| 2015/0377515 A1 | * | 12/2015 | Russell | F24S 80/30 |
| | | | | 126/646 |

* cited by examiner

MONOLITHIC MACRO-FLUIDIC HEAT TRANSFER COMPONENTS AND METHODS FOR MANUFACTURING SAME

FIELD

Embodiments of the invention relate to the fabrication of devices which contain and manipulate the flow of a heat transfer fluid within a device for heat exchange such as a solar thermal collector.

BACKGROUND

Solar Thermal collectors are a kind of heat exchange device which converts sunlight into heat to be used residential or commercial purposes. Another form of heat of exchange device is a mechanism for distilling water that uses solar heat to vaporize liquid water to be distilled. In both cases the device or some aspect of the device requires a large surface area, i.e. macro-scale, in order to capture sunlight and must be structurally sound to support the size which can be on the order of 1 meter by 2 meters in size. The housing of the device must contain all or most of the components to allow for the operation of the heat exchange device. In the case of a liquid based solar thermal collector or other heat exchange device relying on a liquid for a heat transfer fluid, manufacturing is complex and requires the assembly and bonding and mechanical connection of dozens of parts including pipe arrays and interconnects to direct the flow of the liquid. This adds cost and can contribute to reliability issues with the collector.

The use of a gaseous heat transfer fluid (HTF), such as air, can make it possible to simplify the construction of a flat plate solar thermal collector. This is due in part to the fact that air is compatible with a larger array of materials and also is not subject to the same kinds of thermal expansion issues that a liquid heat transfer fluid, such as water, must contend with. Compatibility with a greater array of materials enables the manufacture of structures to manage and direct complex flows of the HTF within the volume of a monolithic device. Access to this extended list of fabrication materials can facilitate simpler and lower cost manufacturing processes as well as the use of lower cost materials in collector construction. While there will be frequent references to the construction of solar thermal collectors within this specification, it should be understood that the processes described are applicable to the construction all heat exchange devices and components of all sizes and forms that rely on air or a gas as a heat transfer fluid.

SUMMARY

According to one aspect of the invention there is provided a monolithic heat exchange component comprising non-metallic material of sufficient mechanical strength to preclude the need for interior or exterior structures made from metal or other high strength materials whose sole or primary function is to provide structural rigidity and/or mechanical support for the component.

According to another aspect of the invention, there is provided a method for fabricating a monolithic heat exchange construct with interior flow control and features to direct the bulk flow of a fluid in one, two, or three dimensions. The method comprises: creating a cavity and core molds, whose geometrical features include mechanical and fluidically functional surfaces and plenum forms, bringing the cavity and core molds into airtight contact, injecting a self-expanding foam polymer precursor mix into the hollow space defined by the molds, extracting the resulting the monolithic construct, and incorporating additional components into the housing construct.

According to another aspect of the invention, there is provided a method for fabricating a monolithic heat exchange construct with interior flow control and features to direct the channelized flow of a fluid in one, two, or three dimensions. The method comprises: creating cavity and core molds, whose geometrical features include mechanical and fluidically functional surfaces and plenum forms, bringing the cavity and core molds into airtight contact, injecting a self-expanding foam polymer precursor mix into the hollow space defined by the molds, extracting the resulting the monolithic construct, and incorporating additional components into the monolithic construct.

According to another of the invention, there is provided a method for fabricating a monolithic heat exchange construct with interior flow control and features to direct the bulk or channelized flow of a fluid in, one, two or three dimensions. The method includes creating a first set of cavity and core molds, whose geometrical features include mechanical and fluidically functional surfaces and plenum forms, bringing the first set of cavity and core molds into airtight contact, injecting a self-expanding foam polymer precursor mix into the hollow space defined by the molds, extracting the resulting first monolithic construct, and incorporating the remaining components into the monolithic construct, creating a one or more additional sets of cavity and core molds, whose geometric features include fluidically functional plenum forms and features, injecting a self-expanding foam polymer precursor mix into the hollow space defined by the additional molds, extracting the resulting monolithic constructs, and bonding the first and additional monolithic constructs together;

Other aspects of the invention will be apparent from the detailed description below.

DETAILED DESCRIPTION

In the following description, for purposes of explanation, numerous specific details are set forth in order to provide a thorough understanding of the invention. It will be apparent however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not others.

Figure 1:
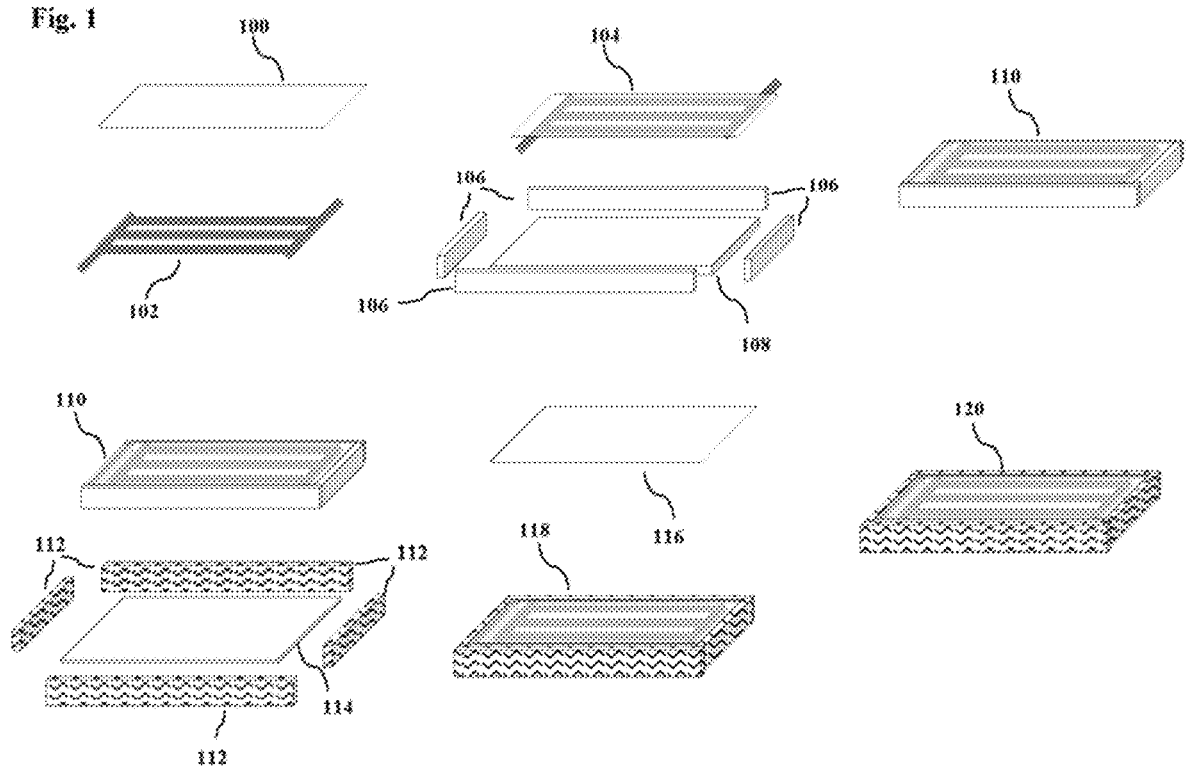
FIG. 1 is a schematic sequence illustrating a representative process for the manufacture of liquid based solar thermal collectors.

Heat exchange devices in the form of a flat plate collectors generally rely on a liquid in the form of water or a water glycol solution to transfer heat from the interior if the collector to an external point of use. The use of the term macro-scale refers to devices which have dimensions on order of 1 meter×2 meter×0.1 meters in depth. This is a size range which is generally suitable for heat exchange devices which collect light. Referring to FIG. 1, a representative process for the manufacture of a flat plate solar thermal collector is shown schematically. Pipe array 102 is a collection of metal pipes usually made from copper which comprises either a single length of pipe which has been bent to form a looping pattern, or a set of pipes which have been drilled and brazed to create a liquid tight array. The pipe array is usually manufactured on site. Absorber sheet 100, is an aluminum or copper sheet that has been coated with a film or set of thin films which make it highly absorbing to incident sunlight while reducing its emissivity. In the first step of manufacture these two components are bonded together using a traditional or ultrasonic welding process to produce the absorber sub-assembly 104. Insulating side slats 106 and insulating back panel 108 are cut to size from large strips of commercially available insulation which could take the form of polyurethane or polyisocyanurate foams. The pieces 106, and 108 are cut to dimensions according to the size of the absorber sub-assembly and the desired total size of the finished panel. After these pieces are bonded together, they are incorporated with the absorber sub-assembly to form the insulated sub-assembly 110. Provision must be made so that the inlet and outlet tubes of the pipe array can extend through the absorber slats. The insulated sub-assembly is not mechanically robust and serves to minimize the amount of heat lost from the absorber sub-assembly to the environment through the sides and the back Structural slats 112 and structural back panel 114 are sized, cut, assembled and then mechanically joined to the insulated sub-assembly 110 to form the collector frame 118. This piece is subsequently mechanically joined and sealed to the glazing 116 to form the finished collector 120. The glazing 116 is most often a low-iron float glass which may have anti-reflection coatings placed on it to improve light transmission. Provision must be made so that the inlet and outlet tubes of the pipe array can extend through the structural slats. It is important to note that structural slats 112 and in some cases back panel 114 are the pieces that provide the structural rigidity and mechanical support for the collector. That is to say that the entire collector is held together by these assembled pieces. That the overall rigidity and resistance to flexing or deformation under the weight of the collector is provided by these pieces, and the collector is secured to external components like a mounting rack or an attachment fixture via a mechanical connection on one or more of structural slats 112 and back panel 114.

While the overall process illustrated in FIG. 1 can be automated to a great extent, it still requires that many separate components be pre-assembled, arranged and mounted, with this process repeated several times depending on the specifics of the collector. The sub-assemblies perform separate functions that require the use of multiple sub-assemblies to achieve full collector functionality. The total parts count is also increased by the number of fasteners, gaskets, rivets, and other small parts which are required to hold the different sub-assemblies together, as well as seal joints between different components. Sealing is very important as the collector must be environmentally robust. Protecting the collector from the elements is made more challenging given the high number of parts and sub-assemblies. In general, these collector designs feature an exterior frame or shell that is made from components as described earlier or can be in the form of a shell often from stamped metal. This is where the bulk of the mechanical strength and rigidity of these collector designs resides. Overall while the cost of the parts compared to the cost of the labor make the labor a significant fraction of the dominant cost of the manufactured collector. As indicated earlier this cost makes it more difficult for sources of solar thermal heat to compete with fossil fuel sources.

Figure 2:
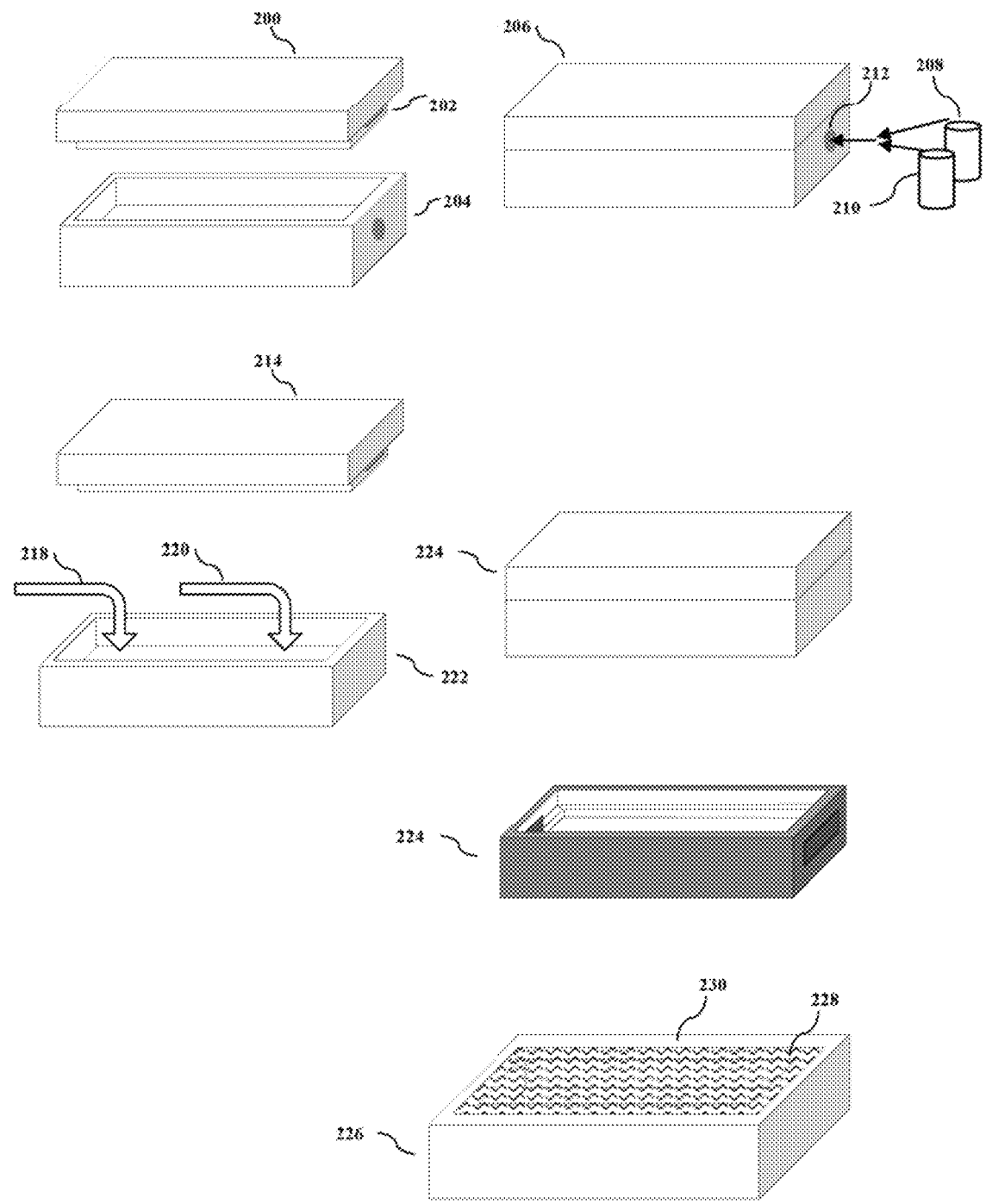
FIG. 2 is a schematic sequence illustrating a process for the manufacture of a monolithic heat exchange construct with interior flow control and features to direct the bulk flow of a fluid in one or two dimensions, in accordance with one embodiment of the invention.

A part of the challenge of creating a less costly heat exchange device in the form of a solar thermal collector is the prevailing use of a liquid as the heat transfer fluid. Utilizing an alternative fluid such as gas or combination of gases like air enables the use of existing materials in a different way and can facilitate the reduction in complexity of a manufacturing process. Referring now to FIG. 2, a process for manufacturing an air-based monolithic heat exchange component is illustrated. In this context the heat exchange component is a platform for the direction and management of interior fluid flows for any number of different kinds of devices for heat exchange including solar thermal collectors. Cavity mold 200, is fabricated from a hardened material such as steel or aluminum or a polymer material such as a polyurethane based foam or acrylic or other plastic which may have metal particles incorporated in order to support heat transfer and includes features on its surface such as output plenum 202, which will be realized in the final part. It is mated to core mold 204, also made from a similar material, and sized so that the two molds can be temporarily mated together in the form of the mold assembly 206. Injection port 212, is a passage or pipe that allows for fluids to be injected into the interior of the mold assembly. Candidates for materials include, but are not limited to, precursor materials to produce foams or plastics media based on polyurethane, polyisocyanurate, phenolic, polyesters, polyphenols, and polyepoxide chemistries. These foams are created by combining one or more fluid precursors 208 and 210, in a process that is known as reaction injection molding which is a well understood and documented process to those skilled in the art of creating foams for insulating or other purposes. For polyurethane foams one precursor is polyisocyanurate and the other component is a blend of polyol, surfactant, catalyst, and blowing agent. In general, upon injection the precursor fluids are mixed and propagate to fill the interior spaces of the mold assembly where they undergo a spontaneous reaction to generate a foam which conforms to the interior geometry. In some cases, the mold is open before the precursor chemicals are introduced. In this case a nozzle 218 or an array of one or more nozzles 218 and 220 are used to apply the foam on the interior surface of the core mold after which the two molds are brought together to form mold assembly 224. The nozzle or nozzle array may be mobile and therefore moved about the surface of the mold manually or via a robotic arm. The mobility of the nozzle or nozzle array is used to take into account the fact that the precursor fluids might have a high viscosity that prevents them from spreading laterally to fill the voids of the mold. There is a curing time ranging from under a minute to tens of minutes or more during which the foam sets. The mold assembly is then separated and monolithic construct 224 is extracted. The mold is often heated to temperatures as high as 195° C. and pressurized to pressures as high as 100 psi. The chemical makeup of the precursor is defined and injected at a pressure so that the resulting foam has a density of less than 5 lbs per cubic foot and preferably 2.5 lbs per cubic foot or less. With regard to fabricating a solar thermal collector, the mold should be designed so as to assure that the distance between the solar absorber and the glazing in the resulting solar thermal collector be greater than 57 millimeters.

The interior surface of the core mold 204 might be initially lined with a flexible hermetic film or combination of films. This laminate could comprise one or more layer of metallic films of foils, such as aluminum or stainless steel, and or acrylic, elastomeric, or rubber like compounds or other robust film materials that can withstand outdoor exposure to the elements and UV without degradation for twenty years or more. The laminate may also be comprised of or incorporate fluoropolymers, aliphatic polyureas, or polyaspartic materials. Other film materials are possible, and the liner may only be lightly attached to the interior surface of the mold or it may not be attached at all. In the latter case, core mold 226 is shown with a flexible laminate film 226 secured to the edge face 228 of core mold 226. During this molding process the precursor materials are injected via a port on the cavity mold, for example injection port 212 of core mold assembly 206, or poured in via nozzles 218 and 220 in core mold 222. As a consequence, the laminate is forced to conform to the interior surface of the core mold during expansion of the foam after the mold assembly has been formed. During curing the laminate is adhered securely to the exterior of the resulting monolithic foam construct. Via any one of the aforementioned processes when the monolithic construct 224 is extracted from the mold its surface will have a protective environmental film, in the form of the liner, to which the foam has created a strong bond during the injection process. Other processes for the in mold creation of the protective film are possible.

Alternatively, this protective environmental film, incorporating the same constituent materials described above, may be applied via a coating or painting like process, or other physical application process, after the molding process has been completed. Thin metal sheets may also be bonded to the collector housing or bonded to and/or buried within the protective film or laminate on the full exterior of the collector, or certain areas which may receive more exposure to the elements during operation. This environmentally robust protective film provides a better seal against the elements given that there are fewer mechanisms, like seals, gaskets, and through holes, that might provide a way for elements like water to seep in.

Figure 3:
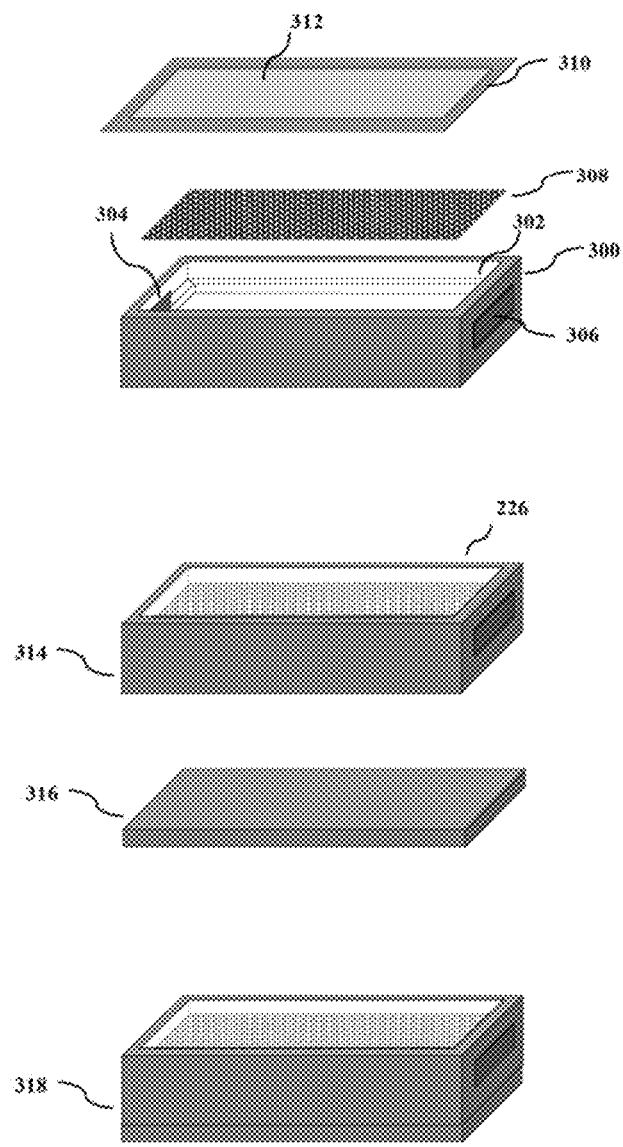
FIG. 3 is a schematic sequence illustrating a process for the manufacture of a monolithic heat exchange construct with interior flow control and features to direct the channelized flow of a fluid in one or two dimensions, in accordance with one embodiment of the invention.

Referring again to FIG. 2, The monolithic construct 224, is sufficiently thick so that it can provide effective thermal insulation between the interior components of the construct and the environment on all sides except that on which the glazing is mounted. Depending on the application and the expected operation temperature this could result in wall thicknesses ranging from 25 mm to 100 mm or more. The inherent rigidity and strength of the foam combined with the overall low weight of the construct can preclude the need of rigid interior and/or exterior mechanical reinforcement or bracing structures. The foam plays the primary structural role in that all of the remaining components to be integrated are coupled to the foam which is the primary provider of the mechanical rigidity for the entire device. Bracing structures no longer required could include exterior shells, casings, interior or exterior frames, or interior bars or struts which may be made from metals or other rigid plastics among other materials. This minimizes cost by reducing component counts. The need for such reinforcement is generally precluded if the thickness and mechanical strength of the foam comprising the construct is sufficient compared to its overall area and the structural loads it will have to endure during operation. In this regard this structural foam plays the same role as, referring again to FIG. 1, structural slats 112 and back panel 114. The structural foam provides the strength to prevent the construct from flexing under its own weight or by the application of reasonable exterior forces. It also provides the mechanical means by which the construct is attached to exterior components like mounting racks or attachment fixtures Referring now to FIG. 3, After a curing time ranging from under a minute to tens of minutes or more during which the foam sets, the mold assembly can be separated to produce the monolithic construct 300 which includes a variety of physical features such as absorber mounting ledge 302, and inlet plenum 304, and outlet plenum 306. These features are mirrored on the molding surfaces of the cavity and core molds. After the creation of the monolithic construct 300, a porous solar absorber sheet 308 and the glazing frame 310 can be integrated in a fairly simple and straightforward like fashion into the final collector product 314. Attachment of the sheets, glazing, and other components can be achieved with the support of environmentally robust and high temperature adhesives. One version of an adhesive is the mixed chemical precursor to the foam itself. In this case a nozzle or nozzle array can be used to apply a bead or film of the precursor on the surface or surfaces to be bonded, and the parts to be adhered are brought together before the foam sets. The result is bond that uses a material that is identical to the foam part to be bonded to. This insures that the adhesive shares the same material properties as the foam.

Referring yet again to FIG. 3, if additional strengthening is required other measures can be taken which are less costly. The foam is rigid and inherently strong under compression, thus the aforementioned environmental protective film can work in concert with the housing to create a stronger rigid body under compressive mechanical stress. This can be accomplished if the protective film undergoes some amount of shrinkage during its curing process or can be made to shrink after it has been coated onto the collector housing, or if is applied in a state of stress. The consequence is that there is no need for internal or external components whose function is to provide mechanical and structural integrity as the foam itself, potentially enhanced by the protective film, is up to the task. In some embodiments for example if glazing 312 is made of a polymer that is under tension, the glazing may be first mounted to a frame 310, which may be made of a more rigid material such as a metal like aluminum, or a reinforced rigid plastic. The frame is then mounted, adhesively and/or mechanically bonded to the collector housing 300. In this configuration the rigid glazing frame can provide additional structural support and mechanical strength to the collector housing via single component i.e. the frame which performs more than one function.

Referring again to FIG. 3, an integrated monolithic construct 314, incorporating a number of added components may also be bonded to a backing panel 316 to provide additional fluidic functionality. The backing panel may be made from the same foam material as monolithic construct 314, or perhaps from other materials. It may be mechanically attached to construct 314 or it may be attached using a variety of adhesives including the precursor adhesive described above to create the finished device 318. Monolithic construct 314 may also be bonded to one or more components which have been fabricated using an injection molding process.

In certain embodiments the glazing may comprise a polymer or fluoropolymer film including but not limited to ethylene-tetrafluoroethylene (ETFE), or fluorinated ethylene propylene (FEP). Such a film could also be put under tension after it is applied or during it. Functions performed by the glazing include protection of interior components from exposure to UV rays and environmental elements, sealing against incursion of environmental contaminants or external air or liquids. It can act as a fluidically functional element and thus cooperate with the interior features of the construct in managing and directing the flow of the HTF.

Referring again to FIG. 3, like all injection molding processes, the creation of the initial mold is very expensive. However, the mold can be used for tens of thousands of times or more, creating mechanical and structural features during the molding process which would otherwise have to be produced by hand or via a robot. Because air is used as a heat transfer fluid, the foam comprising the collector housing can be used to guide its flow, without modification to the foam, through the construct 314, via structures such as input and output plenums 304 and 306. In this case the input plenum provides a means for getting air into the construct while the output plenum allows for its subsequent extraction after being heated. Exposure to air will not degrade most foams if there is minimal water vapor in the air. Additional fluidically functional and structural mechanical features for directing the flow of air within the body of the collector can also be realized by careful design of molds or by the addition of structures, like porous sheet 308, which can participate in guiding the flow of the gas.

Figure 4:
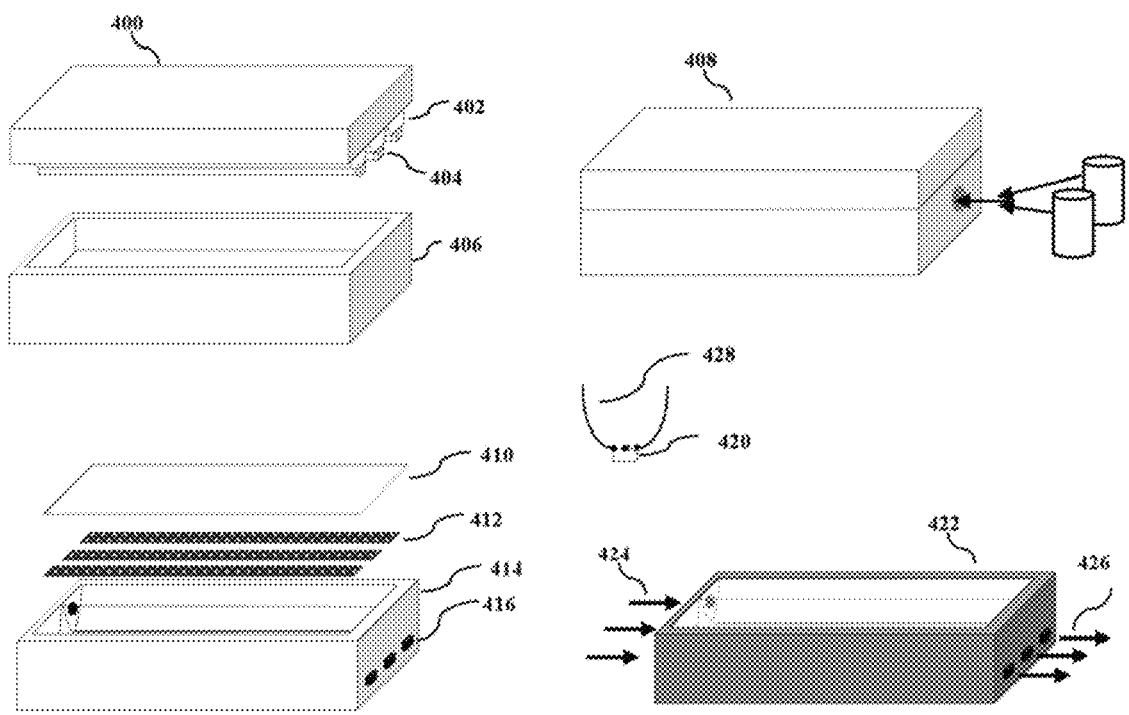
FIG. 4 is a schematic sequence illustrating a process for the manufacture of a monolithic heat exchange construct with interior flow control and features to direct the channelized flow of a fluid in two or three dimensions, in accordance with one embodiment of the invention.

Referring now to FIG. 4, a fabrication sequence is illustrated for the manufacture of heat exchange construct that can channelize the interior flow. That is to say the flow can be divided into separate parallel channels that only interact at the input and the output. Cavity mold 400 is shown with flow directing input plenum 402 and flow directing feature output plenum 404. Mold assembly 408 is created by temporarily mating the cavity and core molds 400 and 406, and precursors are injected to produce the monolithic construct 414 using the process described above. During the injection process the geometric features defined in the mold are transferred to the foam. Thus, monolithic construct 414 incorporates the shaped input and output plenums whose geometry complements that of the input and output plenum forms of the cavity mold. The input plenum 428 and output plenum 420 are shown in cross-section.

After the molding of the collector housing 414, the glazing 410 and absorber 412, can be incorporated and bonded to the housing. Bonding of incorporated features for all foam-based construct designs can be accomplished by some combination of adhesives and/or mechanical fasteners. The absorber strips of this design reside at the base of the input plenum. Fluidically functional features also formed during the monolithic construct foam process include the outlet ports 416 which are aligned with the output plenums.

Figure 5:
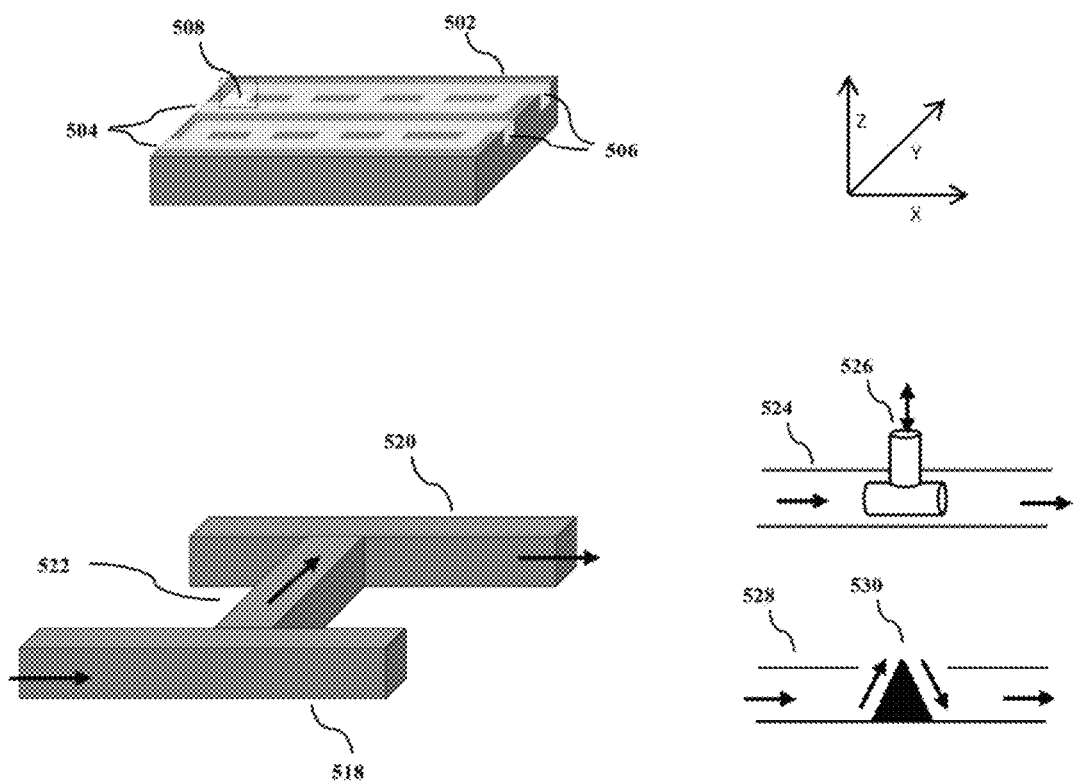
FIG. 5, is a schematic sequence illustrating a process for the manufacture of a monolithic heat exchange construct in accordance with another embodiment of the invention.

In some application, direction flow control may be required in three dimensions. One solution is to pursue is a two-step molding process. Referring now to FIG. 5, in this configuration monolithic construct 502 has been molded using the same techniques as described earlier. In this case the result is a set of parallel input plenums 504 and output plenums 506 which are channels molded into the body of monolithic construct 502. The plenums are physically joined at node slots of which slot 508 is representative. Slot 508 is inside the dashed square to highlight it in the drawing. The combination of input plenums 504, output plenums 506, and node slots 508, make possible the direction of flow in two or three dimensions i.e. X, Y and Z.

Detail of this flow is shown in perspective by input plenum section 518, node zone 522, and output plenum section 520, the flow of air through which is illustrated by the accompanying arrows. Further detail is shown by two variations of a node slot illustrated by node slots 524 and 528 shown in cross section, with the flow of air illustrated by the accompanying arrows. In the case of node slot 524, fitting 526, fits within the node slot and therefore provides fluidic access to the air flow shown. In the case of node slot 528, flow direction feature 530 forces the flow in the Z direction as indicated by the accompanying arrows.

In general, the creation of a monolithic construct 502 describes a means by which complicated air flow patterns can be created by defining the geometry of plenums molded into the plenum form. This can enable complex routing schemes for gases in the X, Y, and Z directions. In all the aforementioned embodiments it is possible to utilize liquid heat transfer fluids if conduits, made from fluid compatible materials, are incorporated into the foam molding process. This would make manufacturing more expensive, but might it be worthwhile for certain applications requiring a liquid heat transfer fluid or combinations of liquid and gaseous heat transfer fluids. For example, very high temperature applications where a thermal oil would be required for the heat transfer fluid, or where it is important for the operation of a system that both liquid and gas heat transfer fluids be incorporated into the finished product.

In general the manufacturing processes described above might benefit from the addition of separately fabricated components including but not limited to plenums for directing gas flows, conduits and pipes for directing liquid flows, heat exchangers, fans, pumps, thermally driven compressors, air filters, and electronic components, may be positioned inside the interior volume of the mold assembly before the precursors are injected. In this way these components could enable increased integration of functionality into the product, for example by facilitating the exchange of heat between a gas and a liquid within the bounds of the monolithic construct. Certain manufacturing efficiencies may also be possible as in the circumstance where creating a permanent interior void or plenum might be impossible using a single molding process step. This may be enabled by incorporating an inexpensive form or hollow structure that defines the shape of the void or plenum during the molding process and remains a part of the finished product. Furthermore, all of the incorporated components will benefit from the environmental protection and thermal insulation characteristics of the foam if that is a desired characteristic. Thus, when these components are designed no effort need by applied in making them environmentally robust.

Overall the construct designs described herein are meant to be representative only and not meant to imply any constraints on the ultimate form of the finished product. Any all dimensions, shapes, orientations and locations of the features portrayed can be changed based on the needs of the heat exchange device, and the design constraints of the requisite molds.

Final products with more complicated interior and exterior geometries may also be created by the assembly and bonding of components created by additional injection molding steps.

The invention claimed is:

1. A solar collector, comprising:
   an absorber sub-assembly comprising:
   a solar absorber;
   a monolithic foam construct defining a collector body adapted to direct a flow of a gaseous heat transfer fluid between an inlet and an outlet; wherein the monolithic foam construct comprises at least one fluidically functional element for directing flow within the collector body.

2. The solar collector of claim 1, wherein the monolithic foam construct provides mechanical support to the absorber sub-assembly without a need for any additional structural components.

3. The solar collector of claim 2, wherein the monolithic foam construct component is of a material selected from the group consisting of foams and plastics based on polyurethane, polyisocyanurate, phenolic, polyesters, polyphenols, and polyepoxide.

4. The solar collector of claim 2, wherein the monolithic foam construct is manufactured by an injection molding process.

5. The solar collector of claim 1, wherein the monolithic foam construct is nonmetallic.

6. The solar collector of claim 1, wherein the monolithic foam construct comprises a plurality of internal channels to cause the heat transfer fluid to flow through the collector in separate parallel channels.

7. The solar collector of claim 1, wherein the monolithic foam construct comprises structures to cause the heat transfer fluid to flow in two dimensions.

8. The solar collector of claim 1, wherein the monolithic foam construct comprises structures to cause the heat transfer fluid to flow in three dimensions.

9. The solar collector of claim 1, wherein the gaseous heat transfer fluid comprises air.

10. The solar collector of claim 1, wherein the solar absorber is bonded to the monolithic foam construct.

11. The solar collector of claim 1, wherein the fluidically functional element comprise a porous sheet.

12. The solar collector of claim 1, wherein the collector body is self-supporting.

13. The solar collector of claim 1, wherein the fluidically functional element comprise a film under tension.

14. The solar collector of claim 1, wherein the fluidically functional element is configured to modify flow of the heat transfer fluid in at least one of two or three dimensions.

15. The solar collector of claim 1, wherein the fluidically functional element comprises at least one outlet port aligned with an output plenum.

16. A method for fabricating a solar thermal collector, comprising:
    fabricating an absorber sub-assembly comprising:
    a solar absorber; and
    a monolithic foam construct defining a collector body adapted to direct a flow of a gaseous heat transfer fluid between an inlet and an outlet; wherein the monolithic foam construct comprises at least one fluidically functional element for directing flow within the collector body; and
    mounting a solar absorber to the monolithic flow control component.

* * * * *